US011040673B2

(12) United States Patent
Kamio

(10) Patent No.: US 11,040,673 B2
(45) Date of Patent: Jun. 22, 2021

(54) CONTROL APPARATUS AND CONTROL METHOD FOR ELECTRIC MOTOR IN VEHICLE

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 44 days.

(21) Appl. No.: 16/674,019

(22) Filed: Nov. 5, 2019

(65) Prior Publication Data

US 2020/0139903 A1 May 7, 2020

(30) Foreign Application Priority Data

Nov. 5, 2018 (JP) ............................ JP2018-207952

(51) Int. Cl.
*B60W 50/038* (2012.01)
*B60R 16/02* (2006.01)
*B60L 15/20* (2006.01)
*H02P 29/024* (2016.01)

(52) U.S. Cl.
CPC .............. *B60R 16/02* (2013.01); *B60L 15/20* (2013.01); *H02P 29/027* (2013.01); *B60L 2240/423* (2013.01)

(58) Field of Classification Search
CPC ...... B60W 50/038; B60R 16/02; B60L 15/20; B60L 2240/423
See application file for complete search history.

(56) References Cited

U.S. PATENT DOCUMENTS

2015/0028785 A1* 1/2015 Tang .................. B60W 50/038 318/434

FOREIGN PATENT DOCUMENTS

JP 2016-147585 A 8/2016

* cited by examiner

*Primary Examiner* — Cortez M Cook
(74) *Attorney, Agent, or Firm* — Oliff PLC

(57) ABSTRACT

A control apparatus for a motor generator in a vehicle includes a first control unit that determines a target torque using a redundant signal and a non-redundant signal, a monitoring unit that determines a monitoring target torque using the redundant signal, and a fail-safe determining unit. The fail-safe determining unit determines the execution of first fail-safe processing when a difference between the target torque and the monitoring target torque is equal to or more than a predetermined first upper limit threshold value or equal to or less than a first lower limit threshold value, and determines the execution of second fail-safe processing when the difference is equal to or more than a predetermined second upper limit threshold value which is smaller than the first upper limit threshold value or equal to or less than a second lower limit threshold value which is smaller than the first lower limit threshold value.

6 Claims, 12 Drawing Sheets

100
RUNNING MODE Mo
ACCELERATOR POSITION Acc
VEHICLE VELOCITY V
10
VEHICLE CONTROL UNIT
TARGET TORQUE Tt
40
MOTOR GENERATOR CONTROL UNIT
MONITORING UNIT
MONITORING TARGET TORQUE Ttw
COMPARE
FAIL-SAFE SIGNAL F/S
M/G CONTROL SIGNAL
MOTOR GENERATOR
20
41

100
10
VEHICLE CONTROL UNIT
TARGET TORQUE Tt
40
MOTOR GENERATOR CONTROL UNIT
M/G CONTROL SIGNAL
MOTOR GENERATOR
41
MONITORING UNIT
MONITORING TARGET TORQUE Ttw
COMPARE
20
FAIL-SAFE SIGNAL F/S
RUNNING MODE Mo
ACCELERATOR POSITION Acc
VEHICLE VELOCITY V

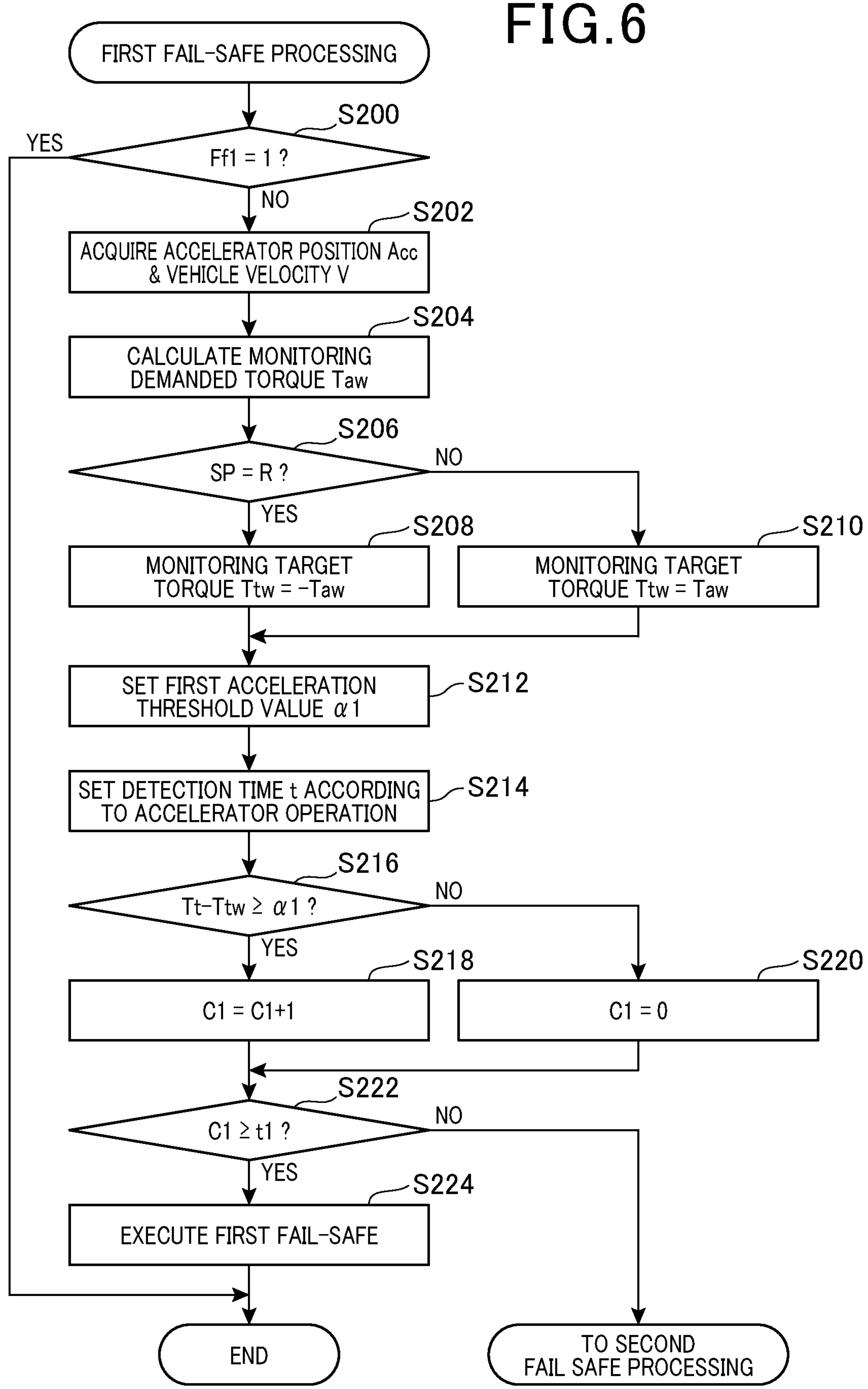
FIG.6
FIRST FAIL-SAFE PROCESSING
S200
Ff1 = 1 ?
YES
NO
S202
ACQUIRE ACCELERATOR POSITION Acc & VEHICLE VELOCITY V
S204
CALCULATE MONITORING DEMANDED TORQUE Taw
S206
SP = R ?
NO
YES
S208
MONITORING TARGET TORQUE Ttw = −Taw
S210
MONITORING TARGET TORQUE Ttw = Taw
S212
SET FIRST ACCELERATION THRESHOLD VALUE α1
S214
SET DETECTION TIME t ACCORDING TO ACCELERATOR OPERATION
S216
Tt−Ttw ≥ α1 ?
NO
YES
S218
C1 = C1+1
S220
C1 = 0
S222
C1 ≥ t1 ?
NO
YES
S224
EXECUTE FIRST FAIL-SAFE
END
TO SECOND FAIL SAFE PROCESSING

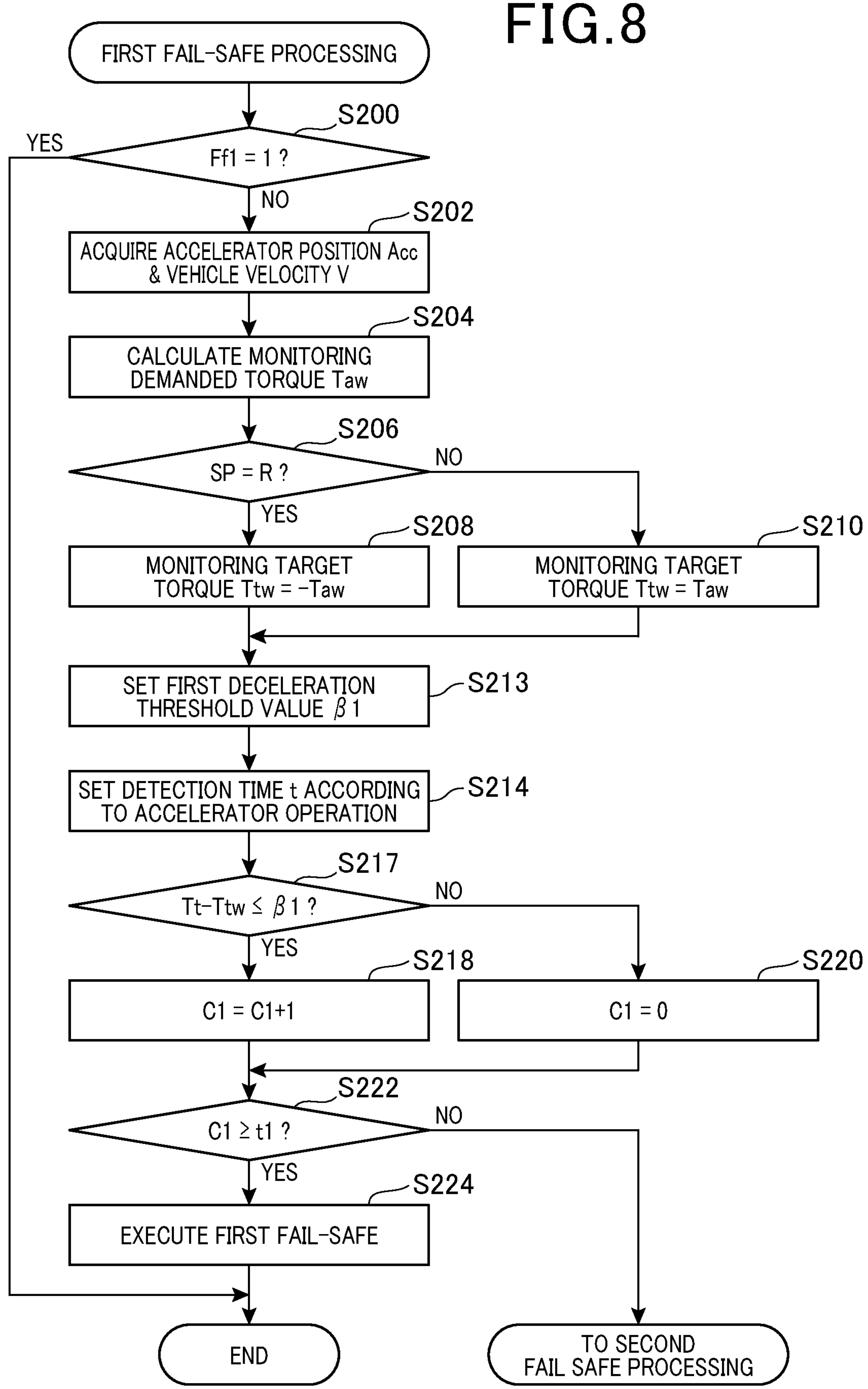
FIG.8
FIRST FAIL-SAFE PROCESSING
S200
Ff1 = 1 ?
YES
NO
S202
ACQUIRE ACCELERATOR POSITION Acc & VEHICLE VELOCITY V
S204
CALCULATE MONITORING DEMANDED TORQUE Taw
S206
SP = R ?
NO
YES
S208
MONITORING TARGET TORQUE Ttw = −Taw
S210
MONITORING TARGET TORQUE Ttw = Taw
S213
SET FIRST DECELERATION THRESHOLD VALUE β1
S214
SET DETECTION TIME t ACCORDING TO ACCELERATOR OPERATION
S217
Tt−Ttw ≤ β1 ?
NO
YES
S218
C1 = C1+1
S220
C1 = 0
S222
C1 ≥ t1 ?
NO
YES
S224
EXECUTE FIRST FAIL-SAFE
END
TO SECOND FAIL SAFE PROCESSING

CONTROL APPARATUS AND CONTROL METHOD FOR ELECTRIC MOTOR IN VEHICLE

CROSS-REFERENCE TO RELATED APPLICATION

This application is based on and claims the benefit of priority from earlier Japanese Patent Application No. 2018-207952 filed on Nov. 5, 2018, the description of which is incorporated herein by reference.

TECHNICAL FIELD

The present disclosure relates to a technique for controlling an electric motor for a vehicle mounted with an electric motor.

BACKGROUND

Known is a technique including a microcontroller as a control unit that controls an actuator and a microcontroller monitoring unit as a monitoring unit that monitors the occurrence of an abnormality in the microcontroller, wherein, when an abnormality occurs within the microcontroller, fail-safe processing is executed (for example, JP 2016-147585 A).

SUMMARY

The present disclosure can be realized as the following aspects.

A first aspect provides a control apparatus for an electric motor for a vehicle. The control apparatus for an electric motor for a vehicle according to the first aspect includes a first control unit that determines a target torque which serves as an output target of the electric motor using a redundant signal and a non-redundant signal, a monitoring unit that determines a monitoring target torque using the redundant signal, and a fail-safe determining unit that determines the execution of fail-safe processing to the electric motor using the target torque and the monitoring target torque.

The fail-safe determining unit determining the execution of first fail-safe processing when a difference between the target torque and the monitoring target torque is equal to or more than a predetermined first upper limit threshold value or equal to or less than a first lower limit threshold value, and determining the execution of second fail-safe processing when the difference is equal to or more than a second upper limit threshold value which is smaller than the first upper limit threshold value or equal to or less than a second lower limit threshold value which is larger than the first lower limit threshold value.

A second aspect provides a control method for an electric motor for a vehicle. The control method for an electric motor for a vehicle according to the second aspect includes steps of determining a target torque which serves as an output target of the electric motor using a redundant signal and a non-redundant signal, determining a monitoring target torque using the redundant signal, and determining the execution of fail-safe processing to the electric motor using the target torque and the monitoring target torque.

The execution of first fail-safe processing is determined when a difference between the target torque and the monitoring target torque is equal to or more than a predetermined first upper limit threshold value or equal to or less than a first lower limit threshold value, and the execution of second fail-safe processing is determined when the difference is equal to or more than a predetermined second upper limit threshold value which is smaller than the first upper limit threshold value or equal to or less than a second lower limit threshold value which is larger than the first lower limit threshold value.

BRIEF DESCRIPTION OF THE DRAWINGS

In the accompanying drawings:

FIG. 6 is a flowchart showing a processing flow of first fail-safe processing to be executed during acceleration by the monitoring unit in the first embodiment;

FIG. 8 is a flowchart showing a processing flow of first fail-safe processing to be executed during deceleration by the monitoring unit in the first embodiment;

DETAILED DESCRIPTION OF THE PREFERRED EMBODIMENTS

Figure 1:
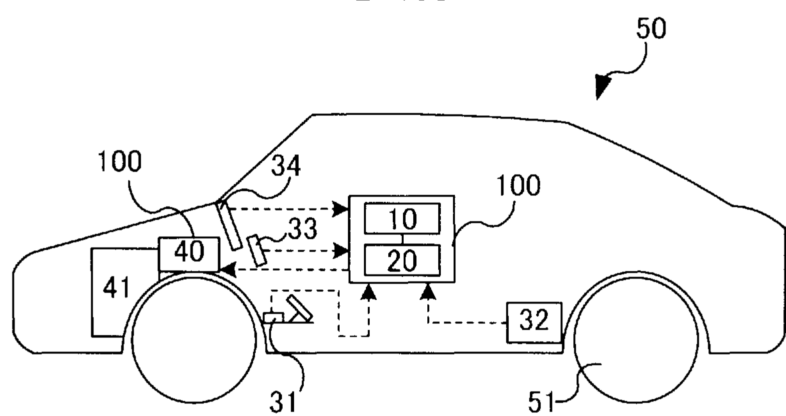
FIG. 1 is an explanatory view showing one example of a vehicle mounted with a control apparatus for an electric motor according to a first embodiment.

In the technique shown in JP 2016-147585 A, for example, however, as aspect in which the control unit determines a target control value using a non-redundant signal that has influence on the determination of the target control value and the monitoring unit monitors an abnormality in the control unit without using any non-redundant signal has not been studied. In this case, the monitoring unit is required to allow a varying range of the target control value which can be set by a non-redundant signal as normal values, in order to avoid erroneous detection of an abnormality in the control unit, and cannot monitor an abnormality in the control unit with high accuracy. A vehicle provided with an electric motor as all or part of its driving source has high responsiveness of an output to an accelerator operation, and thus strong acceleration and deceleration may occur therein even within the varying range of the target control value, resulting in unintentional acceleration/deceleration. Since the operation of the vehicle is regulated by execution of fail-safe processing, the execution of appropriate fail-safe processing is also demanded.

Accordingly, in a vehicle which is provided with an electric motor as a driving source and in which a target torque is determined using a non-redundant signal, the execution of fail-safe processing which appropriately suppresses unintentional acceleration/deceleration is desired.

The present disclosure can be realized as the following aspects.

A first aspect provides a control apparatus for an electric motor for a vehicle. The control apparatus for an electric motor for a vehicle according to the first aspect includes a first control unit that determines a target torque which serves as an output target of the electric motor using a redundant signal and a non-redundant signal, a monitoring unit that determines a monitoring target torque using the redundant signal, and a fail-safe determining unit that determines the execution of fail-safe processing to the electric motor using the target torque and the monitoring target torque.

The fail-safe determining unit determining the execution of first fail-safe processing when a difference between the target torque and the monitoring target torque is equal to or more than a predetermined first upper limit threshold value or equal to or less than a first lower limit threshold value, and determining the execution of second fail-safe processing when the difference is equal to or more than a second upper limit threshold value which is smaller than the first upper limit threshold value or equal to or less than a second lower limit threshold value which is larger than the first lower limit threshold value.

The control apparatus for an electric motor for a vehicle according to the first aspect can be used to execute fail-safe processing which appropriately suppresses unintentional acceleration/deceleration in a vehicle which is provided with an electric motor as a driving source and in which a target torque is determined using a non-redundant signal.

A second aspect provides a control method for an electric motor for a vehicle. The control method for an electric motor for a vehicle according to the second aspect includes steps of determining a target torque which serves as an output target of the electric motor using a redundant signal and a non-redundant signal, determining a monitoring target torque using the redundant signal, and determining the execution of fail-safe processing to the electric motor using the target torque and the monitoring target torque.

The execution of first fail-safe processing is determined when a difference between the target torque and the monitoring target torque is equal to or more than a predetermined first upper limit threshold value or equal to or less than a first lower limit threshold value, and the execution of second fail-safe processing is determined when the difference is equal to or more than a predetermined second upper limit threshold value which is smaller than the first upper limit threshold value or equal to or less than a second lower limit threshold value which is larger than the first lower limit threshold value.

The control method for an electric motor for a vehicle according to the second aspect can be used to execute fail-safe processing which appropriately suppresses unintentional acceleration/deceleration in a vehicle which is provided with an electric motor as a driving source and in which a target torque is determined using a non-redundant signal. It should be noted that the present disclosure can be realized also as a program for controlling an electric motor for a vehicle or a computer-readable recording medium having the program recorded therein.

The control apparatus for an electric motor for a vehicle and the control method for an electric motor for a vehicle according to the present disclosure will be described below based on several embodiments.

First Embodiment

As shown in FIG. 1, a control apparatus 100 for an electric motor for a vehicle according to a first embodiment is used in a state of being mounted in a vehicle 50. The control apparatus 100 includes a vehicle control unit 10 as a first control unit, a monitoring unit 20, and a motor generator control unit 40 as a second control unit. The motor generator control unit 40 may not be included in the control apparatus 100. The vehicle 50 further includes a motor generator 41, an accelerator position sensor 31, a vehicle velocity sensor 32, a shift position sensor 33, and a running mode switch 34. The vehicle 50 in the first embodiment is an electric car including, as the electric motor, the motor generator 41 as a driving source. The motor generator 41 is, for example, an alternating three-phase motor controlled by an inverter provided in the motor generator control unit 40, and can function as an electric motor or a generator. It should be noted that the embodiments including the first embodiment, as described herein, are applicable to vehicles including at least an electric motor at least as all or part of their driving source. Accordingly, the embodiments including the first embodiment, as described herein, are applicable not only to electric cars including a motor generator, but also to hybrid cars and plug-in hybrid cars including an internal combustion engine and a motor generator as driving sources, and electric cars including an electric motor in place of the motor generator 41.

The accelerator position sensor 31 is a sensor that detects the quantity of an accelerator pedal to be pressed down as the opening, i.e., rotation angle, and the detected accelerator position Acc is output as an accelerator position signal. The accelerator off-state means that the accelerator position=0 degree, and the accelerator on-state means that the accelerator position>0 degree. In addition, the operation modes of the accelerator means the quantity of the accelerator pedal to be pressed down, the accelerator on-state, and the accelerator off-state.

The vehicle velocity sensor 32 is a sensor that detects the rotation speed of a wheel 51, and can be provided in each wheel 51. A vehicle velocity signal which indicates a vehicle velocity V output from the vehicle velocity sensor 32 is a pulse wave which indicates a voltage value proportional to the wheel velocity or an interval according to the wheel velocity. A detected signal from the vehicle velocity sensor 32 can be used to obtain information on the velocity, running distance and the like of the vehicle.

The shift position sensor 33 is a sensor that detects the positions of a shift lever, for example, parking P, reverse movement R, neutral N and drive D. Based on a detected signal from the shift position sensor 33, the vehicle control unit 10 can determine whether forward movement or reverse movement of the vehicle 50. The shift lever can determine the shift position through mechanical movement or electrical switching operation. The positions of the shift lever can include various positions such as brake B and manual M.

The running mode switch 34 is a switch for setting the output characteristics of a torque output by the motor generator 41. A running mode Mo selected and set in the running mode switch 34 is output as a running mode signal. As the running mode, a mode such as eco mode, normal mode or sports/power mode can be set. The eco mode is a mode placing importance on the energy efficiency, i.e., the electricity cost rather than the output, in the vehicle 50. The sports mode is a mode placing importance on the running performance, i.e., the output rather than the electricity cost, in the vehicle 50. The normal mode is a mode between the eco mode and the sports mode.

Figure 2:
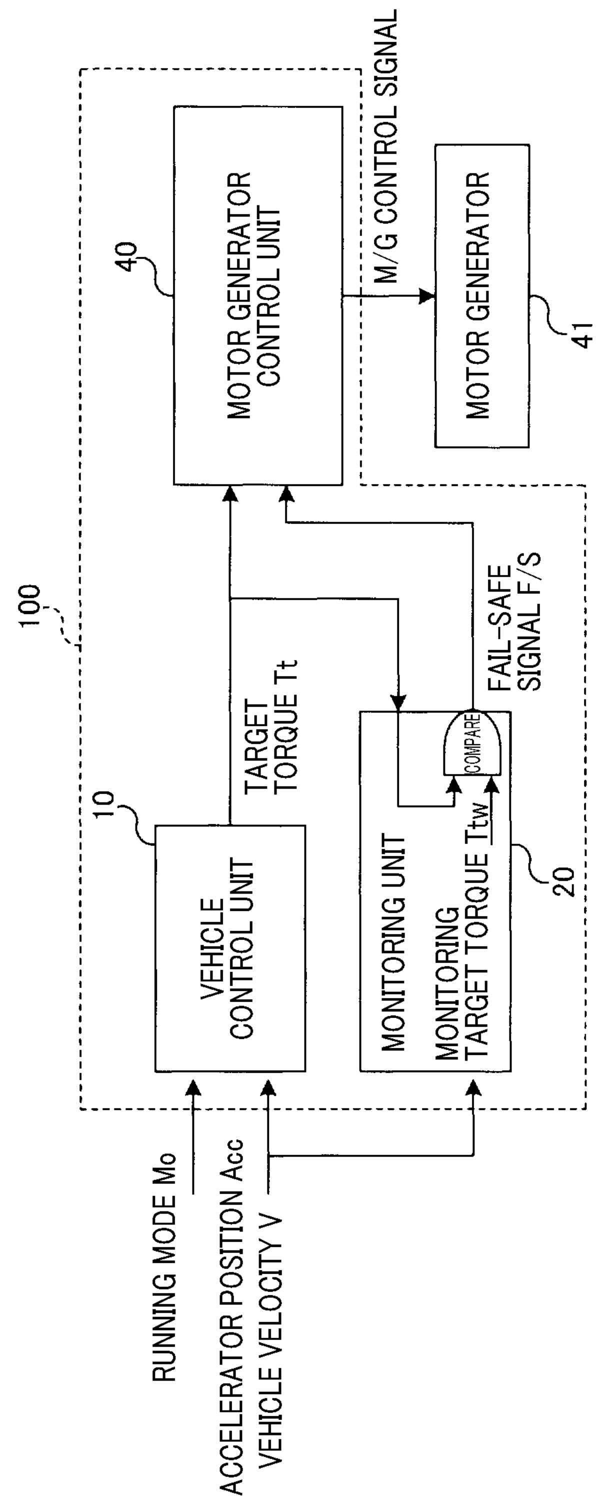
FIG. 2 is a block diagram showing the functional configuration of the control apparatus for an electric motor according to the first embodiment.

As shown in FIG. 2, an accelerator position signal and a vehicle velocity signal, each of which is a redundant signal, and a running mode signal which is a non-redundant signal are input into the vehicle control unit 10. On the other hand, the accelerator position signal and vehicle velocity signal, each of which is a redundant signal, are input into the monitoring unit 20. The redundant signals are signals to be input from a sensor provided with redundancy into the vehicle control unit 10 or signals to be input from a sensor into the vehicle control unit 10 through a signal line provided with redundancy. The non-redundant signal is a signal to be input from a sensor not provided with redundancy into the vehicle control unit 10 or a signal to be input from a sensor into the vehicle control unit 10 through a single signal line. Providing a redundant sensor means, for example, duplication of a detection element, a signal processing circuit and an output unit, duplication of a single detection element, a signal processing circuit and an output unit, and duplication of a single detection element and a signal circuit as well as an output unit. Providing a redundant signal line means, for example, an aspect in which a sensor and the vehicle control unit 10 are connected via two or more signal lines. On the other hand, the sensor not provided with redundancy means a sensor including a single detection element, a signal processing circuit and an output unit, and providing a non-redundant signal line means, for example, an aspect in which a sensor and the vehicle control unit 10 are connected via a single signal line. It should be noted that the redundant signal can be referred to also as highly-reliable signal, and that the non-redundant signal can be referred to also as a low reliability signal. The non-redundant signal can include, in addition to the running mode signal, a one-pedal mode signal which indicates the selection of a one-pedal mode that enables acceleration/deceleration and strong braking through an operation of the accelerator pedal.

In the vehicle control unit 10, a target torque Tt which serves as an output target of the motor generator 41 is calculated using the accelerator position Acc, vehicle velocity V and running mode Mo, and input into the monitoring unit 20 and the motor generator control unit 40. In the monitoring unit 20, a monitoring target torque Ttw is calculated using the accelerator position Acc and vehicle velocity V. The monitoring unit 20 inputs a fail-safe signal F/S into the motor generator control unit 40 in accordance with the result of comparison between the monitoring target torque Ttw and the target torque Tt. The fail-safe signal F/S is a signal for executing fail-safe processing which instructs the motor generator control unit 40 to shut down a relay on a power line to the motor generator 41 and to set the output torque of the motor generator 41 to creep torque [N·m] or 0 [N·m] or which instructs the motor generator control unit 40 to turn off the relay on the power line connected to the motor generator 41. The motor generator control unit 40 inputs an M/G control signal into the motor generator 41 to control the output torque of the motor generator 41, in order to realize the target torque Tt from the vehicle control unit 10. The motor generator control unit 40 shuts down the relay on the power line to the motor generator 41 or controls the output torque of the motor generator 41 to creep torque [N·m] or 0 [N·m], in accordance with the fail-safe signal F/S from the monitoring unit 20.

Figure 3:
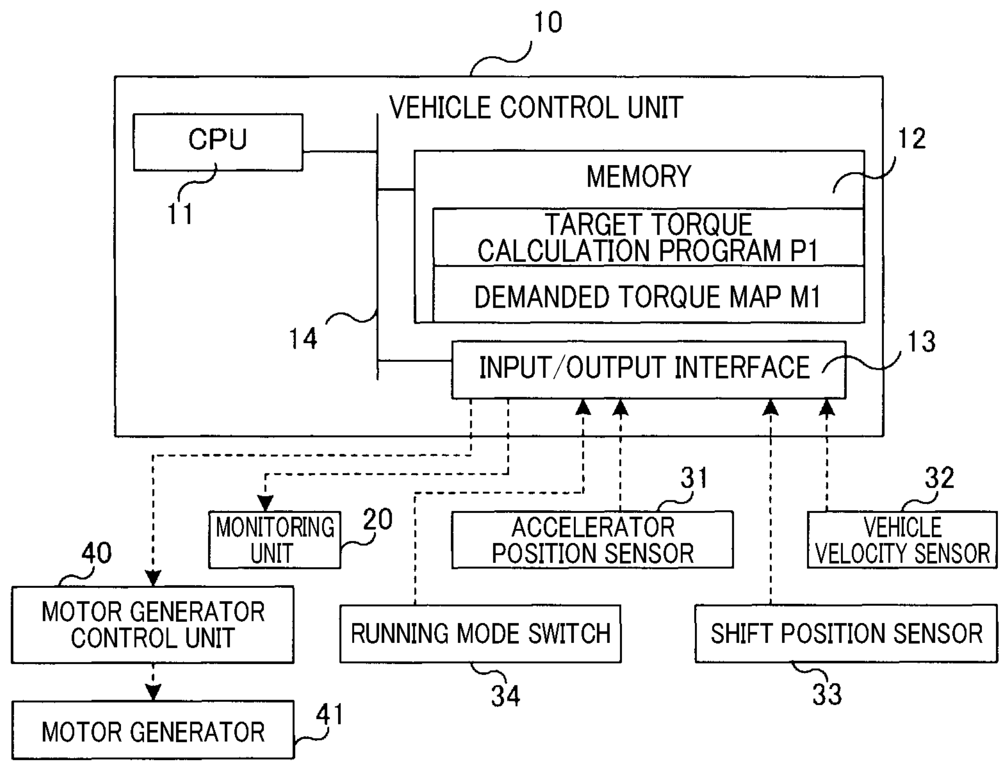
FIG. 3 is a block diagram showing the functional configuration of a vehicle control unit in the first embodiment.

As shown in FIG. 3, the vehicle control unit 10 includes a central processing unit (CPU) 11, a memory 12, an input/output interface 13 and a bus 14. The CPU 11, the memory 12 and the input/output interface 13 are connected via the bus 14 so as to enable bidirectional communication. The memory 12 includes a memory, e.g., ROM, which stores a target torque calculation program P1 for calculating the target torque in a non-volatile and read-only manner and a memory, e.g., RAM, which is readable/writable by the CPU 11. Further, the memory 12 has stored therein a demanded torque map M1 for use in the calculation of a demanded torque. The demanded torque map M1 is a map correlating the accelerator position and the demanded torque with each other in accordance with the running mode, and a plurality of maps are prepared for each vehicle velocity. The CPU 11 develops the target torque calculation program P1 stored in the memory 12 in a readable/writable memory and executes the program, thereby calculating the demanded torque Ta and determining the target torque Tt using a forward movement or reverse movement signal from the shift position sensor 33. The CPU 11 may be a single CPU, may consist of a plurality of CPUs each of which executes each program, or may be a multi-core type CPU which can execute a plurality of programs at the same time.

To the input/output interface 13, the accelerator position sensor 31, the vehicle velocity sensor 32, the shift position sensor 33, the running mode switch 34, the monitoring unit 20 and the motor generator control unit 40 are each connected via a signal line. Detected signals are input from the accelerator position sensor 31, the vehicle velocity sensor 32, the shift position sensor 33 and the running mode switch 34. Redundant signals are input, at least, from the accelerator position sensor 31 and the vehicle velocity sensor 32, and a non-redundant signal is input from the running mode switch 34. Namely, in this embodiment, the accelerator position sensor 31 and the vehicle velocity sensor 32 are sensors provided with redundancy, and the running mode switch 34 is a sensor not provided with redundancy.

Figure 4:
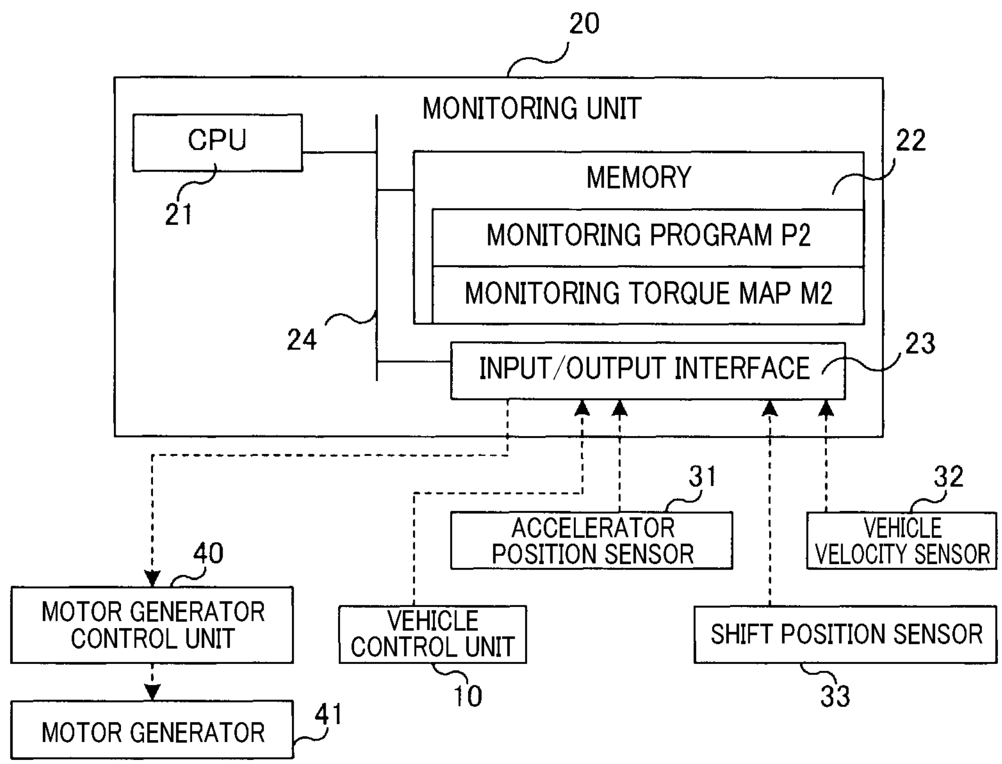
FIG. 4 is a block diagram showing the functional configuration of a monitoring unit in the first embodiment.

As shown in FIG. 4, the monitoring unit 20 includes a central processing unit (CPU) 21, a memory 22, an input/output interface 23 and a bus 24. The CPU 21, the memory 22 and the input/output interface 23 are connected via the bus 24 so as to enable bidirectional communication. The memory 22 includes a memory, e.g., ROM, which stores a monitoring program P2 for calculating a demanded torque Taw for monitoring, judging an abnormality in the vehicle control unit 10 and determining the execution of fail-safe processing in a non-volatile and read-only manner, and a memory, e.g., RAM, which is readable/writable by the CPU 21. Further, the memory 22 has stored therein a monitoring torque map M2 for use in the calculation of the demanded torque Taw for monitoring. The monitoring torque map M2 is a map correlating the accelerator position and the demanded torque with each other, and a plurality of maps are prepared for each vehicle velocity. In addition, the monitoring torque map M2 is correlated with the output characteristics involving the largest demanded torque among the characteristics of a plurality of demanded torques that can be set in accordance with the running mode Mo, i.e., the output torques of the motor generator 41. The CPU 21 develops the monitoring program P2 stored in the memory 22 in a readable/writable memory and executes the program, thereby calculating the demanded torque Taw for monitoring, determining the monitoring target torque Ttw using a forward movement or reverse movement signal from the shift position sensor 33, comparing the target torque Tt and the monitoring target torque Ttw and determining the execution of fail-safe processing. In this embodiment, first fail-safe processing as main abnormality processing and second fail-safe processing as temporary abnormality processing are executed. The CPU 21 may be a single CPU, may consist of a plurality of CPUs each of which executes each program, or may be a multi-core type CPU which can execute a plurality of programs at the same time.

To the input/output interface 23, the accelerator position sensor 31, the vehicle velocity sensor 32, the shift position sensor 33, the vehicle control unit 10 and the motor generator control unit 40 are each connected via a signal line. Detected signals are input from the accelerator position sensor 31, the vehicle velocity sensor 32 and the shift position sensor 33. No detected signal from the running mode switch 34 not provided with redundancy is input into the monitoring unit 20.

Figure 5:
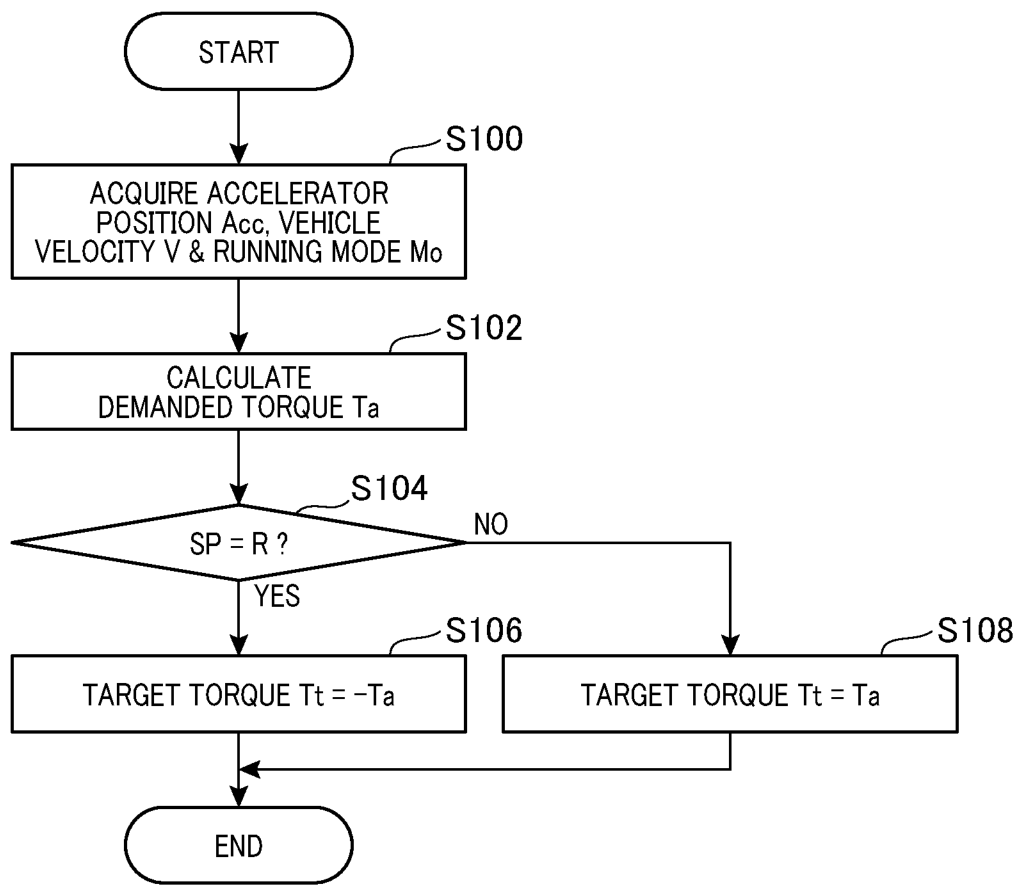
FIG. 5 is a flowchart showing a processing flow of target torque calculation processing to be executed by the vehicle control unit in the first embodiment.

The target torque determination processing to be executed by the control apparatus 100 according to the first embodiment, specifically, the vehicle control unit 10, will be described. The processing routine shown in FIG. 5 is repeatedly executed at predetermined time intervals, for example, in a period from start to stop of a vehicle control system or from when a start switch is turned on to when the start switch is turned off.

Figure 10:
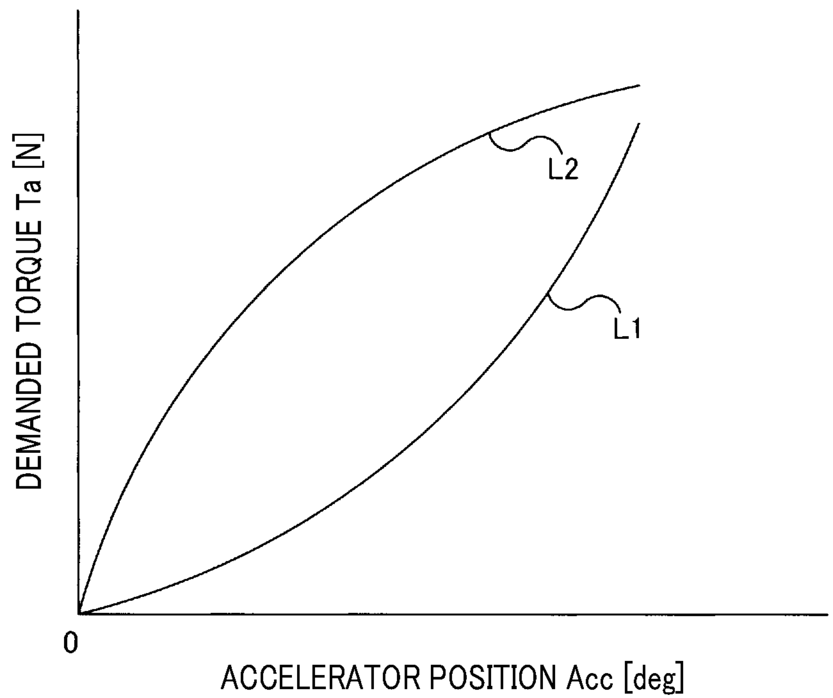
FIG. 10 is an explanatory view showing one example of a demanded torque map to be used for determining a demanded torque.

The CPU 11 acquires the accelerator position Acc, the vehicle velocity V and the running mode Mo via the input/output interface 13 (step S100). The CPU 11 calculates the demanded torque Ta using the acquired accelerator position Acc, vehicle velocity V and running mode Mo and the demanded torque map M1 (step S102). For example, the demanded torque map M1 has a characteristic line L1 when the running mode Mo is the eco mode and a characteristic line L2 when the running mode Mo is a sports mode, as shown in FIG. 10. The characteristic lines L1 and L2 may be corrected in accordance with the vehicle velocity V, and a plurality of each of the characteristic lines L1 and L2 may be prepared for each predetermined vehicle velocity, or a plurality of demanded torque maps M1 may be prepared for each predetermined vehicle velocity V in place of preparation of a plurality of each of the characteristic lines L1 and L2. The CPU 11 judges whether the shift position signal SP from the shift position sensor 33 indicates reverse movement R (step S104). When the shift position signal SP=R, the CPU 11 determines that the target torque Tt=−demanded torque Ta (step S106), and terminates the main processing routine. On the other hand, when the shift position signal SP≠R, the CPU 11 determines that the target torque Tt=demanded torque Ta (step S108), and terminates the main processing routine. The determined target torque Tt is input into the monitoring unit 20 and the motor generator control unit 40.

Figure 7:
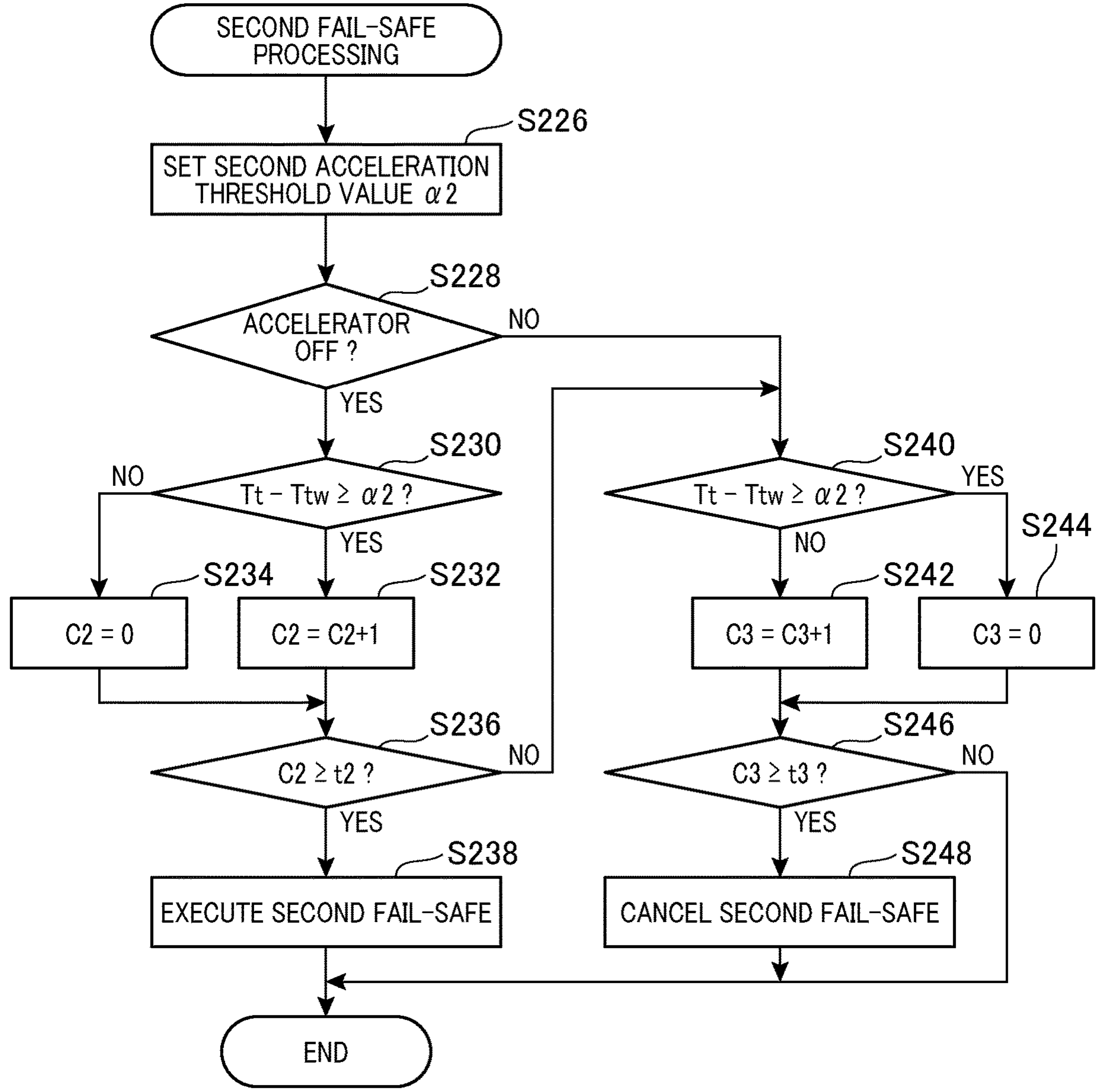
FIG. 7 is a flowchart showing a processing flow of second fail-safe processing to be executed during acceleration by the monitoring unit in the first embodiment.

The fail-safe processing to be executed by the control apparatus 100 according to the first embodiment, specifically, the monitoring unit 20, will be described. The processing routines shown in FIGS. 6 and 7 are processing routines to be executed during acceleration of the vehicle 50, and are repeatedly executed at predetermined time intervals, for example, in a period from start to stop of a vehicle control system or from when a start switch is turned on to when the start switch is turned off. In addition, when the monitoring unit 20 executes the processing of determining the execution of fail-safe processing, i.e., the processing of comparison between the target torque Tt and the monitoring target torque Ttw, the monitoring unit 20 functions as a fail-safe determining unit. Further, separately from the monitoring unit 20, a fail-safe determining unit for executing the processing of comparison between the target torque Tt and the monitoring target torque Ttw may be provided.

Firstly, the CPU 21 starts from first fail-safe processing shown in FIG. 6. The CPU 21 judges whether a first fail-safe flag Ff1 is on, i.e., Ff1=1 (step S200). In this embodiment, the first fail-safe processing is such a processing that, once the execution thereof is determined, the execution is not canceled until the vehicle 50 is restarted. Accordingly, the first fail-safe flag Ff1 is turned on when the execution of the first fail-safe processing is determined, and the first fail-safe flag Ff1 is turned off, i.e., Ff1 is set to 0, when the vehicle 50 is restarted, as will be described later. The "restart of the vehicle 50" means that the start switch of the vehicle 50 is turned off and then turned on, i.e., the control system for the vehicle 50 is restarted. The CPU 21, when judging that the first fail-safe flag Ff1 is on (step S200: Yes), terminates the main processing routine. This is because the execution of the first fail-safe processing has already been determined and the first fail-safe processing has already been executed, as described already.

Figure 11:
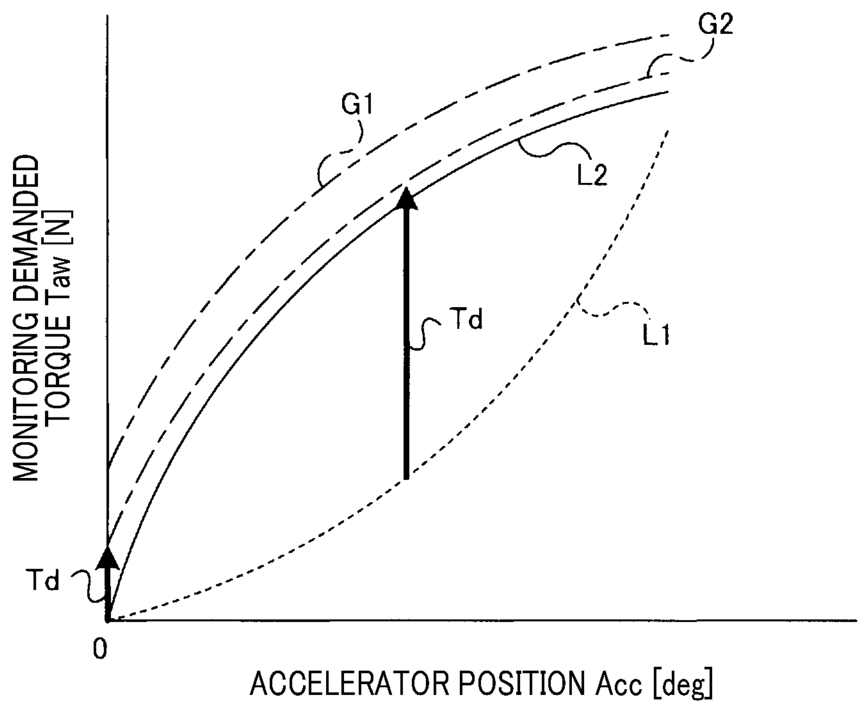
FIG. 11 is an explanatory view showing one example of a monitoring demanded torque map to be used for determining a monitoring demanded torque.

When the CPU 21 judges that the first fail-safe flag Ff1 is off (step S200: No), it acquires the accelerator position Acc and the vehicle velocity V via the input/output interface 23 (step S202). The CPU 21 calculates the demanded torque Taw for monitoring using the acquired accelerator position Acc and vehicle velocity V and the monitoring torque map M2 (step S204). The monitoring torque map M2 has a characteristic line L2 corresponding to the sports mode involving the largest output torque, i.e., the largest output torque corresponding to the accelerator position Acc, among the output characteristics of the motor generator 41 set by the running mode Mo, as shown in FIG. 11. Further, the characteristic line L2 has a characteristic that a torque difference Td from the target torque Tt determined by the vehicle control unit 10 in accordance with other output characteristics of the motor generator 41 set by the running mode Mo is larger in the accelerator on-state than that in the accelerator off-state. The reason for using such an output characteristic or characteristic line L2 is because the monitoring unit 20 calculates the monitoring demanded torque Taw without using a running mode signal, and prevents the erroneous detection of occurrence of an abnormality when the running mode Mo is set to the sports mode. For easy understanding of abnormality judgment, in FIG. 11, there are given a first upper limit threshold value line G1 indicating a torque threshold value based on which the monitoring unit 20 judges that a main abnormality has occurred in the vehicle control unit 10 and a second upper limit threshold value line G2 indicating a torque threshold value based on which the monitoring unit 20 judges that a temporary abnormality has occurred, and the characteristic line L1, as a broken line, used to determine the demanded torque Ta when the running mode Mo is the eco mode. The first upper limit threshold value line G1 is a line plotting a value obtained by adding a first upper limit threshold value $\alpha$1 to each torque value on the characteristic line L2, and the torque value on the first upper limit threshold value line G1 is represented by Ttw+$\alpha$1. The second upper limit threshold value line G2 is a line plotting a value obtained by adding a second upper limit threshold value $\alpha$2 to each torque value on the characteristic line L2, and the torque value on the second upper limit threshold value line G2 is represented by Ttw+α2. Each upper limit threshold value is a threshold value used during acceleration, and thus can be referred to also as threshold value during acceleration. In the above description, the output torque has the same meaning as the monitoring demanded torque Taw and the monitoring target torque Ttw.

Figure 12:
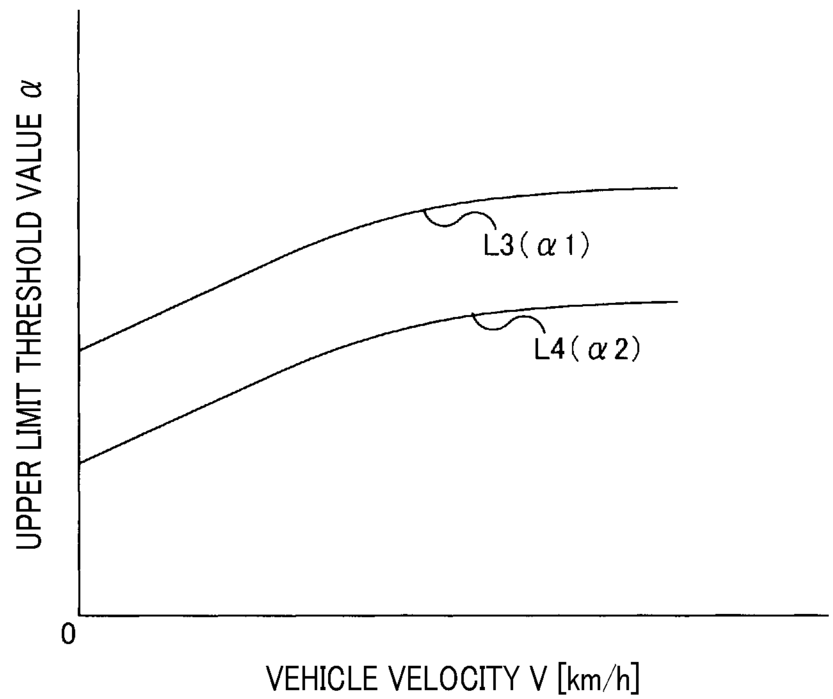
FIG. 12 is an explanatory view showing one example of a map to be used for determining an upper limit threshold value.

The CPU 21 judges whether the shift position signal SP from the shift position sensor 33 indicates reverse movement R (step S206). When the shift position signal SP=R, the CPU 11 determines that the monitoring target torque Ttw=−monitoring demanded torque Taw (step S208). When the shift position signal SP≠R, the CPU 21 determines that the monitoring target torque Ttw=monitoring demanded torque Taw (step S210). The CPU 21 sets the first upper limit threshold value α1 (step S212). The first upper limit threshold value α1 is a threshold value for judging whether a main abnormality, i.e., an abnormality due to which the running of the vehicle 50 is demanded to be stopped immediately, has occurred in the vehicle control unit 10 using the target torque Tt and the monitoring target torque Ttw, and is defined as a characteristic line L3 and set according to the vehicle velocity V, for example, as shown in FIG. 12. In this embodiment, as the vehicle velocity V increases, the first upper limit threshold value α1 and the second upper limit threshold value α2 also increase.

Figure 13:
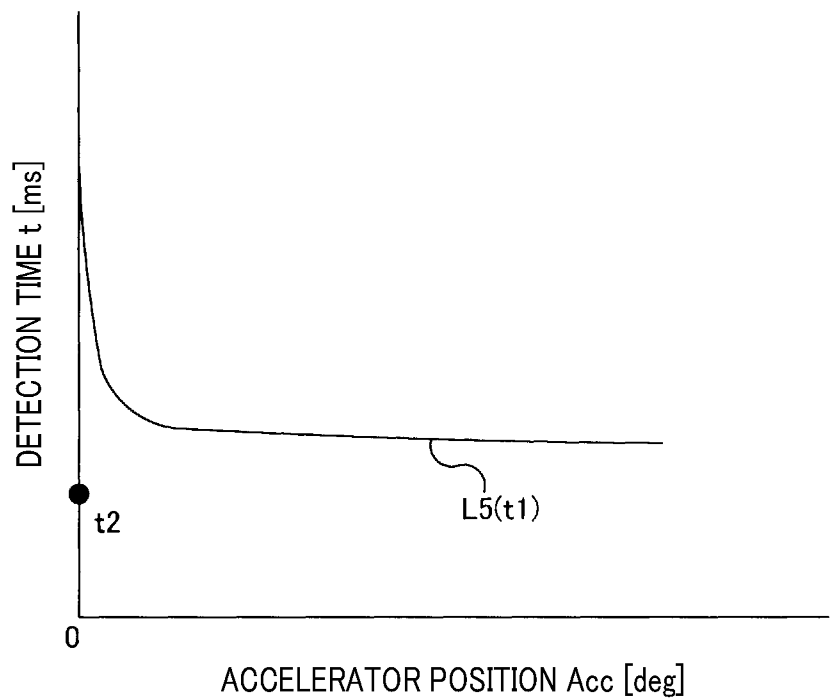
FIG. 13 is an explanatory view showing one example of a map to be used for determining a detection time.

The CPU 21 sets a detection time t in accordance with an accelerator operation (step S214). The accelerator operation can be referred to also as the operation mode of the accelerator. For example, the accelerator position Acc is used as a parameter for judging the operation mode of the accelerator. In this embodiment, in order to suppress an increase in vehicle acceleration G and to promote a reduction in vehicle acceleration G as will be described later, the detection time t is set to be shorter as the accelerator position Acc increases. More specifically, the detection time t1 is set based on a characteristic line L5 and the accelerator position Acc as shown in FIG. 13. In general, the driving region where the accelerator position Acc is full is restrictive, and so-called half throttle and partial throttle are used frequently. So, in this embodiment, the characteristic line L5 is defined so that the detection time t1 is approximately constant when the accelerator position Acc is beyond the predetermined value. The detection time t1 is defined so as to be shorter when the accelerator position Acc is not 0, i.e., in the case of an accelerator on-state, than that when the accelerator position acc is 0, i.e., in the case of an accelerator off-state.

The CPU 21 judges whether the difference between the target torque Tt and the monitoring target torque Ttw is equal to or more than the first upper limit threshold value α1, i.e., Tt−Ttw≥α1 (step S216). When judging that Tt−Ttw≥α1 (step S216: Yes), the CPU 21 judges a possibility that some main abnormality has occurred in the vehicle control unit 10, and increments a count value C1 by 1, i.e., C1=C1+1 (step S218). On the other hand, when judging that the inequality Tt−Ttw≥α1 is not established, i.e., Tt−Ttw<α1 (step S216: No), the CPU 21 judges that no main abnormality has occurred in the vehicle control unit 10, and clears the count value C1, i.e., C1=0 (step S220). The count value C1 can be regarded as a time corresponding to the execution interval time of the processing routines shown in FIGS. 6 and 7. The CPU 21 judges whether the count value C1 has arrived at the detection time t1 or more, i.e., C1≥t1 (step S222). When judging that C1≥t1 (step S222: Yes), the CPU 21 judges that a main abnormality has occurred in the vehicle control unit 10, determines the execution of first fail-safe processing (step S224), and terminates the main processing routine. When the CPU 21 judges that the inequality C1≥t1 is not established, i.e., C1<t1 (step S222: No), the process shifts to the second fail-safe processing shown in FIG. 7. When determining the execution of the first fail-safe processing, the monitoring unit 20 outputs a fail-safe signal F/S to the motor generator control unit 40, shuts down the relay connected to the motor generator 41, turns on the first fail-safe flag Ff1, and further provides an announcement indicating that an abnormality has occurred in the vehicle control unit 10. Announcement may be made by sound indicating that the driving of the motor generator 41 has been stopped due to the occurrence of an abnormality, or by indication on an instrument panel. In addition, announcement to promote inspection and maintenance to the driver may be made. In the first fail-safe processing, the relay is shut down to stop the operation of the motor generator 41 through hardware. So, the relay cannot be restored without stopping the control system for the vehicle, and it is possible to prevent continuous running of the vehicle 50 in a state where a main abnormality has occurred.

Upon start of the second fail-safe processing, the CPU 21 sets a second upper limit threshold value α2 (step S226). The second upper limit threshold value α2 is a threshold value for judging whether a temporary abnormality, i.e., an abnormality with a lower immediate response level than that of the main abnormality in the vehicle 50, has occurred in the vehicle control unit 10, using the target torque Tt and the monitoring target torque Ttw, and is smaller than the first upper limit threshold value α1. The second upper limit threshold value α2 is defined as a characteristic line L4 and set according to the vehicle velocity V, for example, as shown in FIG. 12. It is desirable that the second upper limit threshold value α2 be so smaller than the first upper limit threshold value α1 that no erroneous judgment would be caused, i.e., be as close to the monitoring target torque Ttw as possible, in order to enhance the detection sensitivity for an abnormal state in the vehicle control unit 10. In the example shown in FIG. 11, the second upper limit threshold value line G2 is desirably set to be as close to the characteristic line L2 as possible.

The CPU 21 judges whether the accelerator is OFF (step S228). Specifically, the CPU 21 judges whether the accelerator position Acc input from the accelerator position sensor 31 is 0 degree. Unintentional acceleration of vehicle 50 when the accelerator is OFF, i.e., when the driver does not want to accelerate, will cause anxiety to the driver. On the other hand, in the case where the accelerator is ON, i.e., the driver wants to accelerate or cruise, even if acceleration somewhat higher than the desired acceleration occurs, the driver will hardly fell anxious and turn OFF the accelerator. So, in the second fail-safe processing, the judgment of a temporary abnormality is executed only when the accelerator is OFF. When judging that the accelerator is OFF, the CPU 21 judges whether the difference between the target torque Tt and the monitoring target torque Ttw is equal to or more than the second upper limit threshold value α2, i.e., Tt−Ttw≥α2 (step S230). When judging that Tt−Ttw≥α2 (step S230: Yes), the CPU 21 judges a possibility that some temporary abnormality has occurred in the vehicle control unit 10, and increments a count value C2 by 1, i.e., C2=C2+1 (step S232). On the other hand, when judging that the inequality Tt−Ttw≥α2 is not established, i.e., Tt−Ttw<α2 (step S230: No), the CPU 21 judges that no temporary abnormality has occurred in the vehicle control unit 10, and clears the count value C2, i.e., C2=0 (step S234). The count value C2 can be regarded as a time corresponding to the execution interval time of the processing routines shown in FIGS. 6 and 7. The CPU 21 judges whether the count value C2 has arrived at a detection time t2 or more, i.e., C2≥t2 (step S236). When judging that C2≥t2 (step S236: Yes), the CPU 21 judges that a temporary abnormality has occurred in the vehicle control unit 10, determines the execution of second fail-safe processing (step S238), and terminates the main processing routine. As shown in FIG. 13, since the accelerator position Acc is 0 at the time of execution of steps S230 to S236, the detection time t2 is a predefined fixed value which does not vary depending on the accelerator operation. When the CPU 21 judges that the inequality C2≥t2 is not established, i.e., C2<t2 (step S236: No), the process shifts to step S240. When determining the execution of the second fail-safe processing, the monitoring unit 20 outputs a fail-safe signal F/S to the motor generator control unit 40 and sets the output torque of the motor generator 41 to creep torque [N·m] or 0 [N·m]. This results in suppressing or preventing the occurrence of torque for driving the vehicle 50 and suppressing or preventing the acceleration of the vehicle 50.

Figure 14:
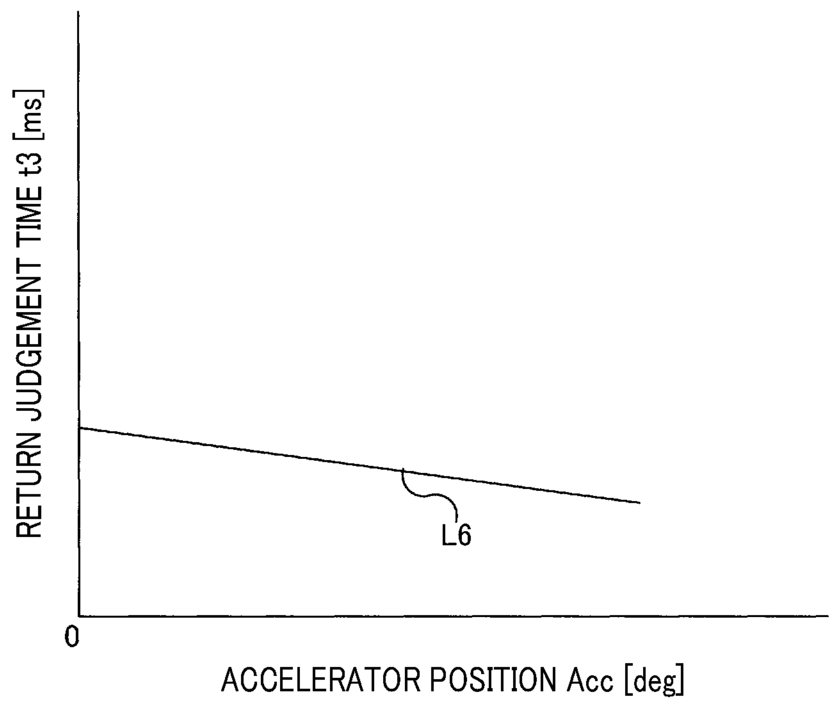
FIG. 14 is an explanatory view showing one example of a map to be used for determining a return judgment time.

When judging that the accelerator is not OFF, i.e., the accelerator is ON (step S228: No), the CPU 21 judges whether Tt−Ttw≥α2 (step S240). The judgments in step S240 et seq. are made to judge whether to cancel the execution of the second fail-safe processing. When judging that Tt−Ttw<α2 (step S240: No), the CPU 21 judges that no temporary abnormality has occurred in the vehicle control unit 10, and increments a count value C3 by 1, i.e., C3=C3+1 (step S242). The count value C3 is a count value for canceling the execution of the second fail-safe processing, and is incremented each time when the CPU 21 judges that no temporary abnormality has occurred. On the other hand, when judging that Tt−Ttw≥α2 (step S240: Yes), the CPU 21 judges a possibility that some temporary abnormality has occurred in the vehicle control unit 10, and a count value C3 is cleared, i.e., C3=+0 (step S244). The count value C3 can be regarded as a time corresponding to the execution interval time of the processing routines shown in FIGS. 6 and 7. The CPU 21 judges whether the count value C3 has arrived at a return judgment time t3 or more, i.e., C3≥t3 (step S246). When judging that the inequality C3≥t3 is not established, i.e., C3<t3 (step S246: No), the CPU 21 terminates the main processing routine without canceling the execution of the second fail-safe processing. When judging that C3≥t3 (step S246: Yes), the CPU 21 judges that the temporary abnormality in the vehicle control unit 10 has been overcome, cancels the execution of the second fail-safe processing (step S248), and terminates the main processing routine. Since the second fail-safe processing, i.e., the output suppression processing, within the region where the accelerator position Acc is large imparts a sense of discomfort to the driver, the return judgment time t3 is set to be shorter as the accelerator position Acc increases. More specifically, the return judgment time t3 is set based on a characteristic line L6 and the accelerator position Acc as shown in FIG. 14.

Figure 9:
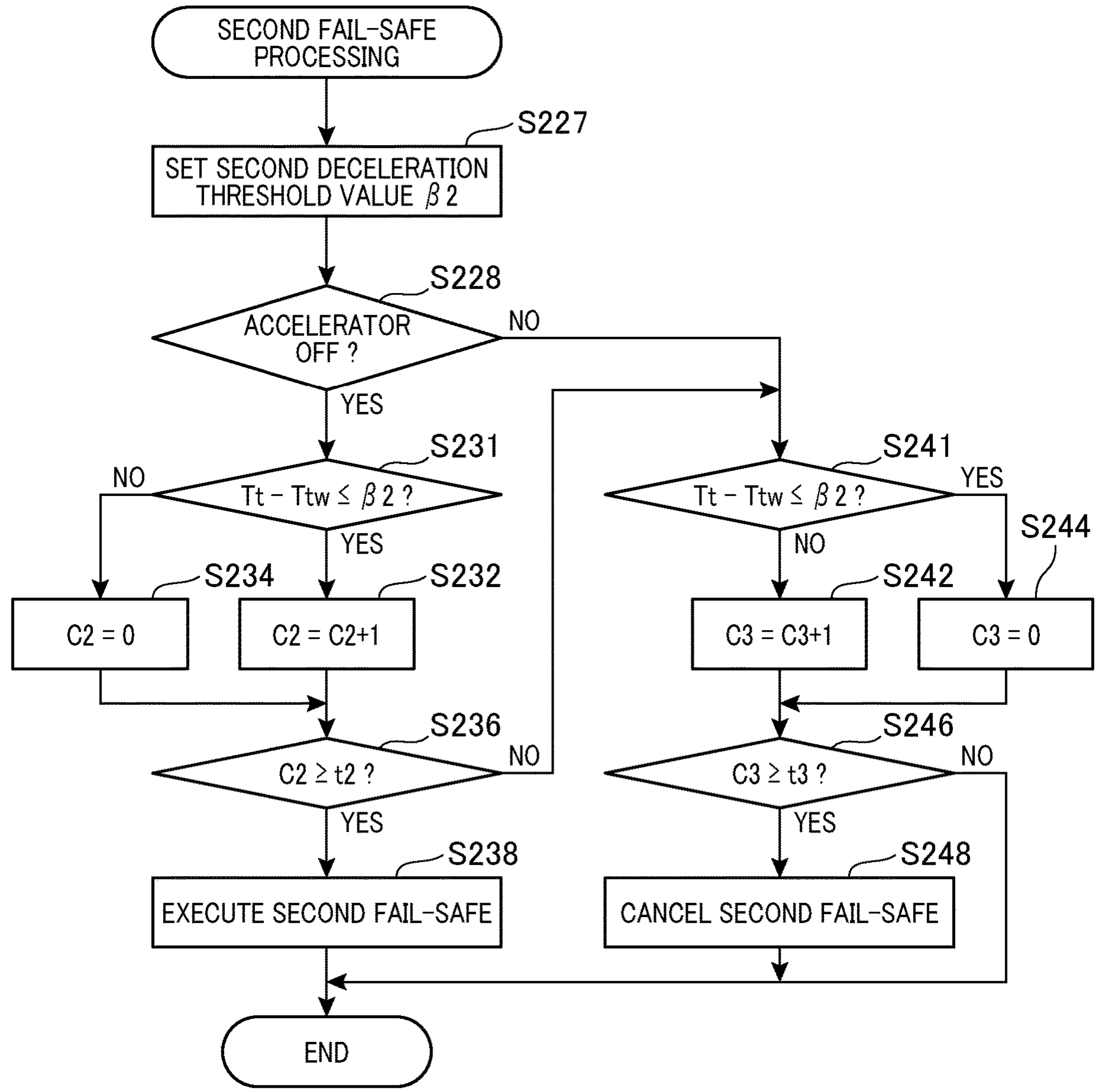
FIG. 9 is a flowchart showing a processing flow of second fail-safe processing to be executed during deceleration by the monitoring unit in the first embodiment.

Next, the fail-safe processing to be executed during deceleration of the vehicle 50 will be described with reference to FIGS. 8 and 9. Fail-safe processing during deceleration is repeatedly executed under conditions similar to those employed in the case of the fail-safe processing during acceleration except that it is executed during deceleration of the vehicle 50. Similarly, the monitoring unit 20 functions as a fail-safe determining unit and a fail-safe determining unit may be provided separately from the monitoring unit 20. The processing steps similar to those during acceleration, in the processing flows shown in FIGS. 8 and 9, will not be described with the same reference numbers being attached thereto.

Figure 15:
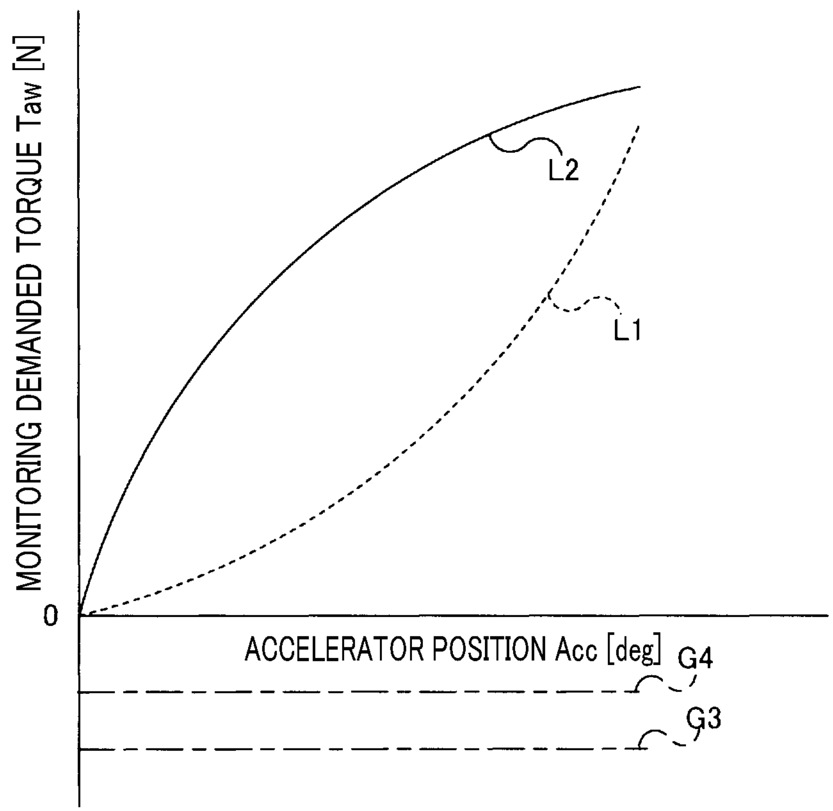
FIG. 15 is an explanatory view showing one example of the monitoring demanded torque map to be used for determining the monitoring demanded torque.

Firstly, the CPU 21 starts from first fail-safe processing shown in FIG. 8. The CPU 21 executes steps S200 to S204. The monitoring torque map M2 has a characteristic line L2 corresponding to the sports mode as shown in FIG. 15. For easy understanding of abnormality judgment, in FIG. 15, there are given a first lower limit threshold value line G3 indicating a torque threshold value based on which the monitoring unit 20 judges that a main abnormality has occurred in the vehicle control unit 10 and a second lower limit threshold value line G4 indicating a torque threshold value based on which the monitoring unit 20 judges that a temporary abnormality has occurred, and the characteristic line L1, as a broken line, used to determine the demanded torque Ta when the running mode Mo is the eco mode. The first and second upper limit threshold value lines G3 and G4 are constant values which do not depend on the accelerator position Acc. In the case where two maps, i.e., a map for the acceleration time having the characteristic line L2 and a map for the deceleration time having the characteristic line L1 are present as monitoring torque maps M2, the monitoring demanded torque Taw may be calculated using the characteristic line L1.

Figure 16:
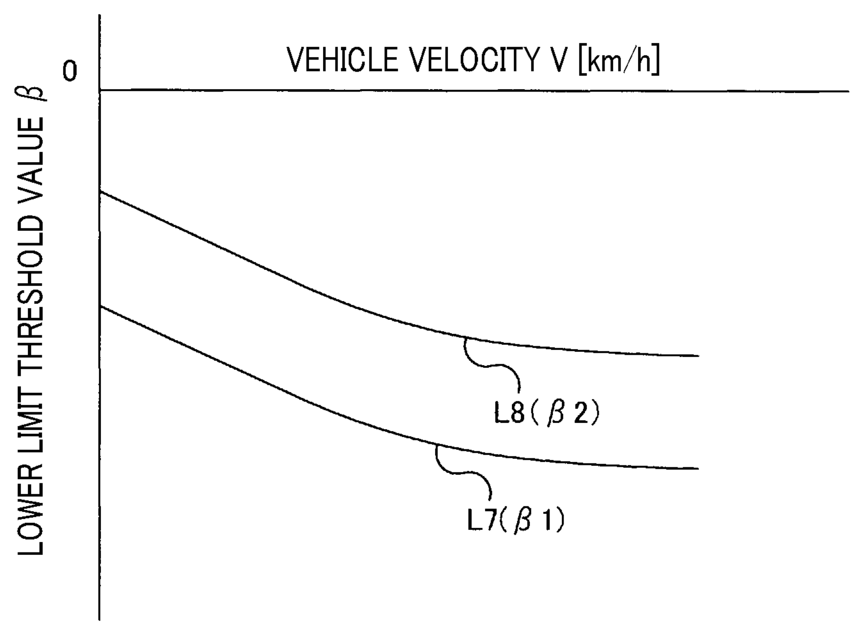
FIG. 16 is an explanatory view showing one example of a map to be used for determining a lower limit threshold value.

The CPU 21 executes steps S206 to S210. The CPU 21 sets a first lower limit threshold value β1 (step S213). The first lower limit threshold value β1 is a threshold value for judging whether a main abnormality, i.e., an abnormality due to which the running of the vehicle 50 is demanded to be stopped immediately, has occurred in the vehicle control unit 10 using the target torque Tt and the monitoring target torque Ttw, and is defined as a characteristic line L7 and set according to the vehicle velocity V, for example, as shown in FIG. 16. In this embodiment, as the vehicle velocity V increases, the first lower limit threshold value β1 and a second lower limit threshold value β2 decrease. Namely, the lower limit threshold values become larger as absolute values. Each lower limit threshold value is a threshold value used during deceleration, and thus can be referred to also as threshold value during deceleration.

The CPU 21 sets the detection time tin accordance with the accelerator operation (step S214). The CPU 21 judges whether the difference between the target torque Tt and the monitoring target torque Ttw is equal to or less than the first lower limit threshold value β1, i.e., Tt−Ttw≤β1 (step S217). When judging that Tt−Ttw≤β1 (step S217: Yes), the CPU 21 judges a possibility that some main abnormality has occurred in the vehicle control unit 10, and increments a count value C1 by 1 (step S218). On the other hand, when judging that the inequality Tt−Ttw≤β1 is not established, i.e., Tt−Ttw>β1 (step S217: No), the CPU 21 judges that no main abnormality has occurred in the vehicle control unit 10, and clears the count value C1 (step S220). The CPU 21 judges whether the count value C1 has arrived at the detection time t1 or more (step S222). When judging that C1≥t1 (step S222: Yes), the CPU 21 selects execution of the first fail-safe processing (step S224), and terminates the main processing routine. When the CPU 21 judges that the inequality C1≥t1 is not established (step S222: No), the process shifts to the second fail-safe processing shown in FIG. 9. The monitoring unit 20, when determining the execution of the first fail-safe processing, executes the first fail-safe processing described already.

Upon start of the second fail-safe processing, the CPU 21 sets the second lower limit threshold value β2 (step S227). The second lower limit threshold value β2 is a threshold value for judging whether a temporary abnormality, i.e., an abnormality with a lower immediate response level than that of the main abnormality in the vehicle 50, has occurred in the vehicle control unit 10, using the target torque Tt and the monitoring target torque Ttw, and is larger than the second lower limit threshold value β1. The second lower limit threshold value β2 is defined as a characteristic line L8 and set according to the vehicle velocity V, for example, as shown in FIG. 16. The second lower limit threshold value β2 is a threshold value for judging that the difference between the target torque Tt and the monitoring target torque Ttw during deceleration is smaller, and in order to increase the detection sensitivity of the abnormal state in the vehicle control unit 10, it is desirable that the second lower limit threshold value β2 is larger than the first lower limit threshold β1 to the extent that no erroneous determination occurs.

The CPU 21 judges whether the accelerator is OFF (step S228). When judging that the accelerator is OFF (step S228: Yes), the CPU 21 judges whether the difference between the target torque Tt and the monitoring target torque Ttw is equal to or less than the second lower limit threshold value β2, i.e., Tt−Ttw≤β2 (step S231). When judging that Tt−Ttw≤β2 (step S231: Yes), the CPU 21 judges a possibility that some temporary abnormality has occurred in the vehicle control unit 10, and increments a count value C2 by 1 (step S232). On the other hand, when judging that the inequality Tt−Ttw≤β2 is not established, i.e., Tt−Ttw>β2 (step S231: No), the CPU 21 judges that no temporary abnormality has occurred in the vehicle control unit 10, and clears the count value C2 (step S234). The CPU 21 judges whether the count value C2≥t2 (step S236). When judging that C2≥t2 (step S236: Yes), the CPU 21 determines the execution of second fail-safe processing (step S238), and terminates the main processing routine. Since the accelerator position Acc is 0, the detection time t2 is a predefined fixed value which does not vary depending on the accelerator operation. When the CPU 21 judges that the inequality C2≥t2 is not established (step S236: No), the process shifts to step S241. The monitoring unit 20, when determining the execution of the second fail-safe processing, executes the second fail-safe processing described already via the motor generator control unit 40. This results in suppressing or preventing the occurrence of torque for driving the vehicle 50 and suppressing or preventing the deceleration of the vehicle 50.

When judging that the accelerator is not OFF (step S228: No), the CPU 21 judges whether Tt−Ttw≤β2 (step S240). The judgments after step S240 are made to judge whether to cancel the execution of the second fail-safe processing. When judging that the inequality Tt−Ttw≤β2 is not established (step S241: No), the CPU 21 judges that no temporary abnormality has occurred in the vehicle control unit 10, and increments a count value C3 by 1 (step S242). On the other hand, when judging that Tt−Ttw≤α2 (step S241: Yes), the CPU 21 judges a possibility that some temporary abnormality has occurred in the vehicle control unit 10, and clears the count value C3 (step S244). The CPU 21 judges whether C3≥t3 (step S246). When judging that the in equation C3≥t3 is not established (step S246: No), the CPU 21 terminates the main processing routine without canceling the execution of the second fail-safe processing. When judging that C3≥t3 (step S246: Yes), the CPU 21 cancels the execution of the second fail-safe processing (step S248), and terminates the main processing routine.

The control apparatus 100 according to the first embodiment described above can execute the first fail-safe processing that deals with the main abnormality and the second fail-safe processing that deals with the temporary abnormality. The upper limit threshold value and lower limit threshold value used to judge the determination as to the execution of the fail-safe processing, in the second fail-safe processing, are smaller than the upper limit threshold value and larger than the lower limit threshold value, respectively, in the first fail-safe processing. So, the control apparatus can execute fail-safe processing which appropriately suppresses unintentional acceleration/deceleration in a vehicle which is provided with an electric motor as a driving source and in which a target torque is determined using a non-redundant signal. Namely, the control apparatus can execute the fail-safe processing for suppressing or preventing acceleration/deceleration of the vehicle 50 which is not intended by the driver while suppressing or preventing erroneous detection of an abnormality. In addition, since the execution of the first fail-safe processing, i.e., the first fail-safe processing involved in the judgment on a main abnormality, is maintained until restart of the vehicle 50, i.e., within the same trip, it is possible to present the running of the vehicle 50 in a state of being accompanied with a main abnormality. On the other hand, since the execution of the second fail-safe processing, i.e., the second fail-safe processing involved in the judgment of a temporary abnormality, can be canceled even within the same trip, the output of the torque according to the driver's demand is permitted, thereby making it possible to execute the fail-safe processing to a temporary abnormality while reducing the driver's sense of discomfort or without imparting a sense of discomfort to the driver.

Announcement to the driver is not executed at the time of judgment on a temporary abnormality, i.e., execution of the second fail-safe processing, in the above embodiment, but may be executed. It is possible to notify the driver of the occurrence of some minor abnormality. The relay is shut down at the time of executing the first fail-safe processing due to a major abnormality in the above embodiment, but the processing of setting the demanded driving force to creep or 0 may be executed as is the case with the execution of the second fail-safe processing. In this case, when, as a result of analysis of an event via communications, for example, in a service center, it is decided that the event is not a major abnormality judgment, the execution of the first fail-safe processing can be remotely canceled via communications.

Other Embodiments (1) The vehicle 50 in which the running mode Mo can be switched by the running mode switch 34 has been described as an example in the above embodiment. However, similar effects can be obtained by a vehicle 50 which is not provided with such a running mode switch 34 and in which the output characteristics of the motor generator 41 are changed depending on the accelerator position Acc, demanded torque or the like. Alternatively, the present disclosure can be applied to a vehicle 50 in which the output characteristics of the motor generator 41 are changed by a non-redundant signal indicating any vehicle setting other than the running mode Mo.

(2) The on/off-state of the accelerator is judged in step S228 also in the fail-safe processing during deceleration in the above embodiment. However, step S228 may not be provided. This is because the accelerator is, generally, turned off during deceleration. In this case, when it is judged that the inequality C2≥t2 is not established in step S236, steps S241 to S248 are executed as the return judgment processing.

(3) The execution of the second fail-safe processing is canceled by carrying out the return judgment processing in the above embodiment. However, the cancellation of the second fail-safe processing may not be carried out. Namely, since the judgment on the possibility of occurrence of a temporary abnormality is accumulated, it is also conceivable to promote inspection and maintenance to the driver in order to analyze temporary abnormality events.

(4) The fail-safe processing during acceleration and the fail-safe processing during deceleration have been described using different processing flows, for easy explanation, in the above embodiment. In this case, it is possible to judge that the vehicle 50 is in an accelerated or decelerated state, and then to execute the processing flows shown in FIGS. 6 and 7 when the vehicle 50 is in an accelerated state and to execute the processing flows shown in FIGS. 8 and 9 when it is in a decelerated state. The fail-safe processing may also be executed during either acceleration or deceleration. On the other hand, it is also conceivable to execute the processing up to the calculation of the monitoring target torque Ttw as a common flow, and to selectively execute steps S212, S213, S216, S217, S226, S227, S230, S231, S240 and S241 according to the judgment as to whether the vehicle 50 is in an accelerated or decelerated state.

(5) In the above embodiment, the execution of the target torque calculation program P1 by the CPU 11 and the execution of the monitoring program P2 by the CPU 21 realize the vehicle control unit 10 and the monitoring unit 20 through software. However, they may also be realized through hardware by a previously-programmed integrated circuit or discrete circuit.

The present disclosure has been described based on the embodiments and variations. The above-described embodiments are provided for easy understanding of the present disclosure and do not limit the present disclosure. The present disclosure may be modified and improved without departing the spirit and the scope of claims, and encompasses equivalents thereof. For example, the embodiments corresponding to the technical features in the various aspects described in the summary section, and the technical features described in the variations can be appropriately replaced or combined to solve part or all of the above-described problems or to achieve part or all of the above-described effects. Moreover, if those technical features are not described herein as essential features, the features can be appropriately removed. For example, a control apparatus for an electric motor for a vehicle according to the above-described first aspect can be defined as Application Example 1. Further, the following application examples can be provided.

Application Example 2

The control apparatus for an electric motor for a vehicle according to Application Example 1, wherein the fail-safe determining unit cancels the determination on the execution of the second fail-safe processing when the difference is less than the second upper limit threshold value or less than the second lower limit threshold value.

Application Example 3

The control apparatus for an electric motor for a vehicle according to Application Example 1 or 2, wherein the fail-safe determining unit maintains the determination on the execution of the first fail-safe until the vehicle is subjected to start processing again.

Application Example 4

The control apparatus for an electric motor for a vehicle according to any one of Application Examples 1 to 3, wherein the fail-safe determining unit performs processing of determining the execution of the second fail-safe processing when an accelerator pedal is not operated.

Application Example 5

The control apparatus for an electric motor for a vehicle according to any one of Application Examples 1 to 4, which further includes a second control unit that controls the electric motor, the second control unit stopping the electric motor according to the determination on the execution of the first or second fail-safe processing by the fail-safe determining unit.

What is claimed is:

1. A control apparatus for an electric motor for a vehicle comprising:

a first control unit that determines a target torque which serves as an output target of the electric motor using a redundant signal and a non-redundant signal;

a monitoring unit that determines a monitoring target torque using the redundant signal; and a fail-safe determining unit that determines the execution of fail-safe processing to the electric motor using the target torque and the monitoring target torque, wherein the fail-safe determining unit determining the execution of first fail-safe processing when a difference between the target torque and the monitoring target torque is equal to or more than a predetermined first upper limit threshold value or equal to or less than a first lower limit threshold value, and determining the execution of second fail-safe processing when the difference is equal to or more than a predetermined second upper limit threshold value which is smaller than the first upper limit threshold value or equal to or less than a second lower limit threshold value which is larger than the first lower limit threshold value.

2. The control apparatus for an electric motor for a vehicle according to claim 1, wherein the fail-safe determining unit cancels the determination on the execution of the second fail-safe processing when the difference is less than the second upper limit threshold value or less than the second lower limit threshold value.

3. The control apparatus for an electric motor for a vehicle according to claim 1, wherein the fail-safe determining unit maintains the determination on the execution of the first fail-safe until the vehicle is subjected to start processing again.

4. The control apparatus for an electric motor for a vehicle according to claim 1, wherein the fail-safe determining unit performs processing of determining the execution of the second fail-safe processing when an accelerator pedal is not operated.

5. The control apparatus for an electric motor for a vehicle according to claim 1, which further includes:

a second control unit that controls the electric motor, the second control unit stopping the electric motor according to the determination on the execution of the first or second fail-safe processing by the fail-safe determining unit.

6. A control method for an electric motor for a vehicle comprising:

determining a target torque which serves as an output target of the electric motor using a redundant signal and a non-redundant signal;

determining a monitoring target torque using the redundant signal; and determining the execution of fail-safe processing to the electric motor using the target torque and the monitoring target torque, wherein the execution of first fail-safe processing is determined when a difference between the target torque and the monitoring target torque is equal to or more than a predetermined first upper limit threshold value or equal to or less than a first lower limit threshold value, and the execution of second fail-safe processing is determined when the difference is equal to or more than a predetermined second upper limit threshold value which is smaller than the first upper limit threshold value or equal to or less than a second lower limit threshold value which is larger than the first lower limit threshold value.

* * * * *